United States Patent

Enami

[11] Patent Number: 5,678,946
[45] Date of Patent: Oct. 21, 1997

[54] JOINT STRUCTURE FOR METAL PLATES

[75] Inventor: Toshiaki Enami, Kyoto, Japan

[73] Assignee: Enami Seiki Mfg. Co., Ltd., Yao, Japan

[21] Appl. No.: 590,223

[22] Filed: Jan. 23, 1996

[51] Int. Cl.$^6$ .................................................. B25G 3/28
[52] U.S. Cl. ........................ 403/282; 403/274; 403/285; 403/393; 29/509
[58] Field of Search ........................ 403/282, 285, 403/274, 393; 29/509, 521

[56] References Cited

U.S. PATENT DOCUMENTS

| | | | |
|---|---|---|---|
| 2,688,890 | 9/1954 | Williams | 29/521 |
| 2,916,181 | 12/1959 | Pfister et al. | 29/521 |
| 2,924,312 | 2/1960 | Williams | 29/521 |
| 3,288,489 | 11/1966 | Jahn | 29/521 X |
| 3,599,318 | 8/1971 | Behlen | 403/285 X |
| 3,729,804 | 5/1973 | Middleton | 29/521 |
| 3,824,757 | 7/1974 | Coop | 29/521 X |
| 3,919,955 | 11/1975 | DuVernay | 29/509 |
| 3,981,064 | 9/1976 | Hafner | 29/521 X |
| 4,734,971 | 4/1988 | Dupasquier . | |
| 4,805,592 | 2/1989 | Enami | 29/521 X |
| 4,831,711 | 5/1989 | Rapp | 403/285 X |
| 4,986,691 | 1/1991 | Hafner | 403/285 X |
| 5,408,735 | 4/1995 | Schleicher | 29/521 X |
| 5,520,475 | 5/1996 | Coolman et al. | 29/525 X |

FOREIGN PATENT DOCUMENTS

| | | |
|---|---|---|
| 0278998 | 8/1988 | European Pat. Off. . |
| 55-033809 | 3/1980 | Japan . |
| 57-190737 | 11/1982 | Japan . |
| 5-62241 | 9/1993 | Japan . |

OTHER PUBLICATIONS

Manual published by the James F. Lincoln Arc Welding Foundation, pp. 314 TO 317, 8th printing, Aug. 1976, (Lincoln Electric Co.).
M. L. Begemann et al., Manufacturing Processes, sixth edition, Sep. 15, 1985, Taiwan, pp. 324, 325, 328, 329.
Design Manual, pp. 3.6–12, 3.6–13, 4.2–2 to 4.2–5.
"Design of Weldments" Manual published by the James F. Lincoln Arc Welding Foundation, pp. 314 to 3176, 8th printing, Aug. 1976 (Lincoln Electric Co.).
M. L. Begemann et al., Manufacturing Processes—Sixth edition, Sep. 15, 1972, Taiwan, pp. 324,325, 328, 329.

Primary Examiner—Anthony Knight
Assistant Examiner—Bruce A. Lev
Attorney, Agent, or Firm—W. G. Fasse; W. F. Fasse

[57] ABSTRACT

A joint structure provides a strong contact force between two metal plates that are joined together by the joint structure. A first metal plate is provided with a lug and an opening under the lug. An edge portion of a second metal plate is inserted under the lug and partially press molded with the lug, so as to be press-fitted into the opening in a state wherein the press-fitted portion is held between the opening and the lug. The press-fitted portion of the second metal plate has a cutoff edge portion which is cut off from the remaining portion of the plate, and a connected edge portion which is not cut off from but remains connected with the remaining portion. The cutoff edge portion contacts a corresponding edge of the opening in the first metal plate to ensure and maintain proper lateral registration of the two plates.

18 Claims, 9 Drawing Sheets

JOINT STRUCTURE FOR METAL PLATES

BACKGROUND OF THE INVENTION

1. Field of the Invention

The present invention relates to a joint structure joining two metal plates with each other, which joint structure is formed by shape changes of these metal plates to be joined with each other.

2. Description of the Background Art

For joining metal plates together, there have generally been proposed various joint structures employing welding, riveting, caulking, curling and the like.

In parts or areas of an article of merchandise that are exposed, however, it is desirable to use pre-painted steel plates to avoid the need for an after-painting operation. In this case, employment of the welded joint structure is inefficient since the joint portions must be again painted after the welding.

In the riveted joint structure, on the other hand, rivets are required in addition to the metal plates to be joined with each other, and complicated operations such as formation of holes for receiving the rivets, and insertion and caulking of the rivets, as well as specific apparatuses for carrying out these operations are also required.

In the joint structure utilizing plastic deformation such as caulking or curling, painted steel plates can be employed to omit the painting operation. However, this structure requires a specific mold, a specific apparatus etc. to carry out the joining.

Japanese Patent Publication No. 5-62241 (1993) and related U.S. Pat. No. 4,805,592 (Enami) disclose a joint structure for metal plates, which can solve the aforementioned problems. With those known joint structures, metal plates can be readily joined with each other without requiring a special apparatus for carrying out the joining.

FIGS. 17 to 22 illustrate the known joint structure which is disclosed in Japanese Patent Publication No. 5-62241 and U.S. Pat. No. 4,805,592.

Referring to FIG. 17, a plurality of joint portions 3 are formed in relation to joining first and second metal plates 1 and 2 together. In the respective joint portions 3, lugs 4 which are formed on the first metal plate 1 extend toward the second metal plate 2 and downwardly press parts of an end portion of the second metal plate 2 against the first metal plate 1, as if the second metal plate 2 is stitched into the first metal plate 1.

The joint structure shown in FIG. 17 is obtained in the following manner. Referring to FIG. 18, the first and second metal plates 1 and 2 are first prepared. The second metal plate 2 is not subjected to any preliminary working. On the other hand, the first metal plate 1 is provided with the lugs 4 to have openings 5 as follows.

FIG. 19 is a plan view showing a lug 4 which is still in an unraised state. As shown in FIG. 19, a clearance 6 is formed between opening edges 5a defining the size of each opening 5 of the first metal plate 1 and each lug 4. The clearance 6 is rendered larger than the thickness of the second metal plate 2.

FIG. 20 is a plan view showing the first and second metal plates 1 and 2 which are joined with each other. FIGS. 21 and 22 are sectional views taken along the lines XXI—XXI and XXII—XXII in FIG. 20 respectively.

As shown in FIGS. 21 and 22, a part 2a of the end or edge portion of the second metal plate 2 which is superposed with the first metal plate 1 is press-molded with the lug 4 so as to be press-fitted into the opening 5 without being cut off from the remaining portion 2b, in a state held between the opening 5 and the lug 4 of the first metal plate 1. In other words, as shown especially in FIG. 22, the part 2a remains connected to the plate 2 and is formed by molding or bending and without cutting the plate 2.

In the joined state, the press-fitted portion 2a of the second metal plate 2 is in contact with the opening edges 5a of the first metal plate 1, as shown in FIGS. 21 and 22.

According to the joint structure shown in FIGS. 17 to 22, it is possible to readily join metal plates that are to be joined with each other without requiring special working apparatus. However, this joint structure still has a point to be improved.

As described with reference to FIG. 19, the clearance 6 which is larger than the thickness of the second metal plate 2 is present between each lug 4 and the opening edges 5a of the first metal plate 1. As shown in FIGS. 21 and 22, therefore, a portion 2c connecting each press-fitted portion 2a and the remaining portion 2b of the second metal plate 2 extends through the clearance 6 in a direction not perpendicular to but inclined with respect to the surface plane direction. Therefore, the contact force between the press-fitted portion 2a of the second metal plate 2 and the opening edges 5a of the first metal plate 1 is so weak that misregistration may be caused between the metal plates 1 and 2.

SUMMARY OF THE INVENTION

An object of the present invention is to improve the joint structure for metal plates which is disclosed in Japanese Patent Publication No. 5-62241 and U.S. Pat No. 4,805,592. In more concrete terms, the object of the present invention is to provide a joint structure which can provide a stronger contact force.

The joint structure for metal plates according to the present invention is characterized by the following points. A first metal plate is provided with a lug to have an opening. An end or edge portion of a second metal plate which is superposed with the first metal plate is partially press-molded with the lug, to be press-fitted into the opening in a state held between the opening and the lug. The press-fitted portion of the second metal plate has a cutoff portion or edge which is cut off from the remaining portion, and a connected portion or edge which is not cut off from but connected with the remaining portion.

The press-fitted portion of the second metal plate is firmly connected with the remaining portion through the connected portion, not to be cut off from the remaining portion. On the other hand, the press-fitted portion of the second metal plate has a large contact force since the cutoff portion edge thereof strikes and comes into contact with opening edges of the first metal plate. According to the present invention, therefore, a joint structure providing stronger contact force is attained.

In an embodiment of the present invention, a clearance between the opening edges defining the size of the opening of the first metal plate and the lug is smaller in a portion corresponding to the cutoff portion of the press-fitted portion of the second metal plate, and larger in a portion corresponding to the connected portion of the second metal plate. Preferably, the clearance is rendered smaller than 30% of the thickness of the second metal plate in the portion corresponding to the cutoff portion of the press-fitted portion, and larger than the thickness of the second metal plate in the portion corresponding to the connected portion.

In another embodiment of the present invention, the lug of the first metal plate is provided along its outer edges with an embedded portion which is flush with the remaining portion of the second metal plate and a mount portion which mounts the remaining portion of the second metal plate. The cutoff portion of the second metal plate is positioned under the embedded portion of the second metal plate, while the connected portion is positioned under the mount portion.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
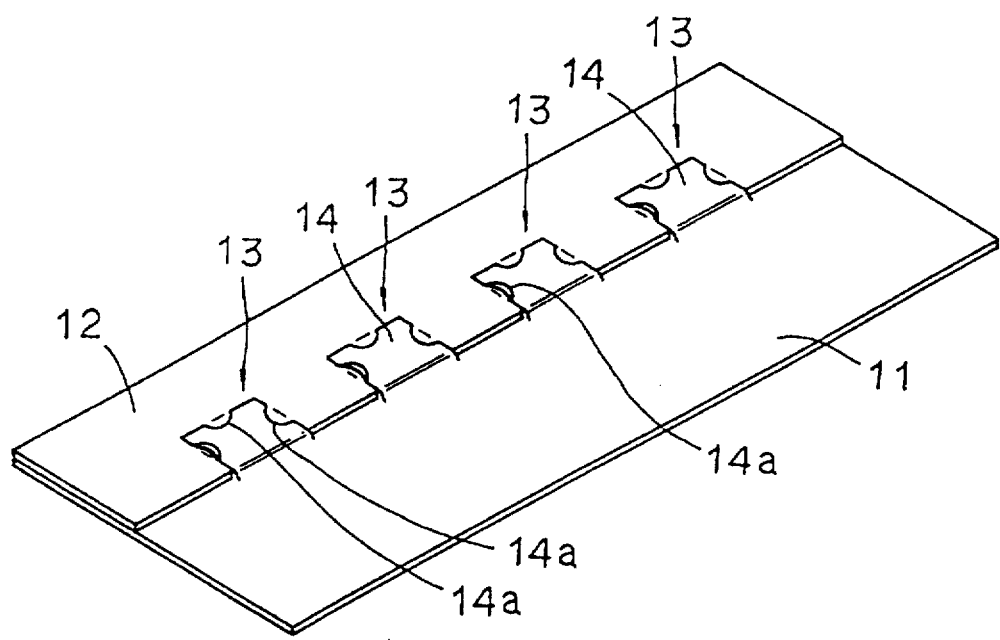
FIG. 1 is a perspective view showing an embodiment of the present invention.
Figure 3:
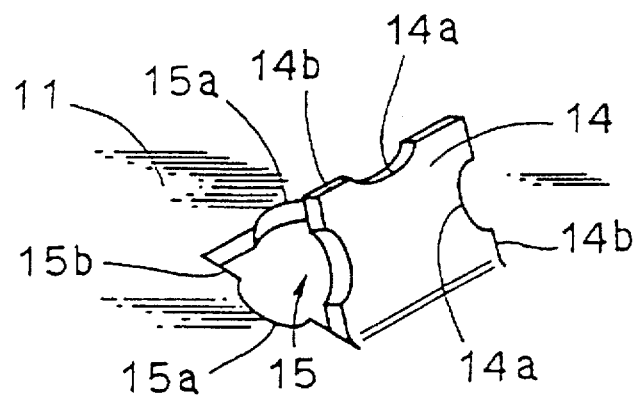
FIG. 3 is a perspective view showing the lug which is in a raised state.

FIG. 1 is a perspective view showing the appearance of a joint structure according to an embodiment of the present invention. A plurality of joint portions 13 are formed in joining first and second metal plates 11 and 12 together. The first metal plate 11 is provided with lugs 14, to have openings 15 at corresponding positions of said lugs 14 (FIG. 3). The second metal plate 12 is subjected to no preliminary working for forming the joint structure. Parts of an edge of the second metal plate 12 are press-molded with the lugs 14, to be press-fitted into the openings 15 in a state held between the openings 15 and the lugs 14 of the first metal plate 11 as described below.

Figure 2:
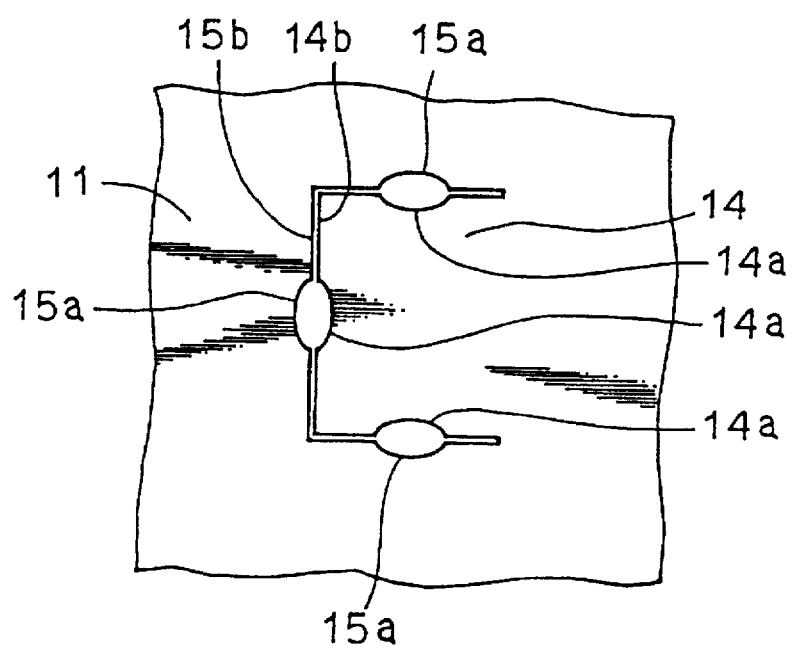
FIG. 2 is a plan view showing a lug which is still in an unraised state.

FIG. 2 is a plan view showing each lug 14 which is in a still unraised state, and FIG. 3 is a perspective view showing the lug 14 which is in a raised state, i.e. having been bent upward from the plate 11. As shown in FIGS. 2 and 3, each lug 14 of the first metal plate 11 is provided along its free edges with recesses 14a and linear edge portions 14b. Similarly, recesses 15a and linear edge portions 15b are provided along opening edges defining the size of each opening 15.

Each lug 14 shown in FIGS. 2 and 3 is formed in the following manner, for example. First, elliptic holes are formed in the first metal plate 11, thereby providing the recesses 14a and 15a. Then, the linear portions 14b and 15b are formed by shearing. A lug root edge remains, to connect the lug 14 to the first metal plate 11.

The maximum clearance between each recess 14a of each lug 14 and each recess 15a of each opening 15 is preferably rendered larger than the thickness of the second metal plate 12. On the other hand, the clearance between each linear portion 14b of each lug 14 and each linear portion 15b of each opening 15 is rendered smaller than 30% of the thickness of the second metal plate 12.

Figure 4:
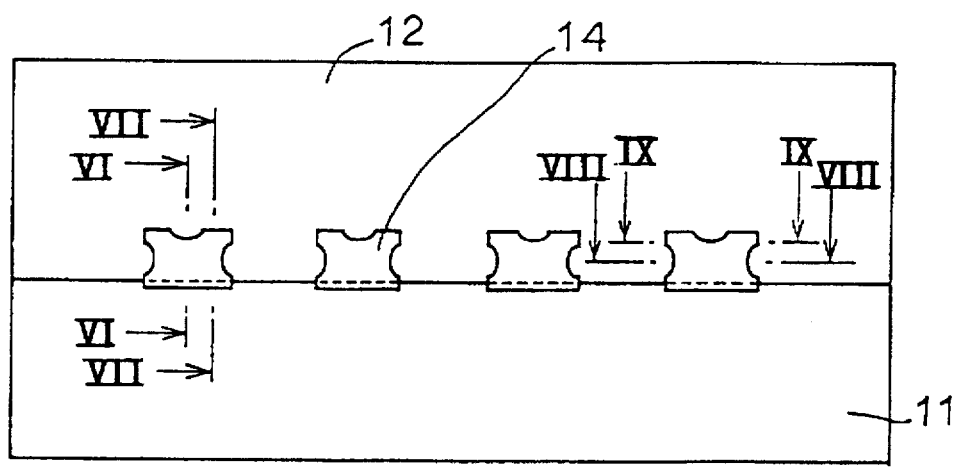
FIG. 4 is a plan view showing the embodiment of the present invention.
Figure 5:
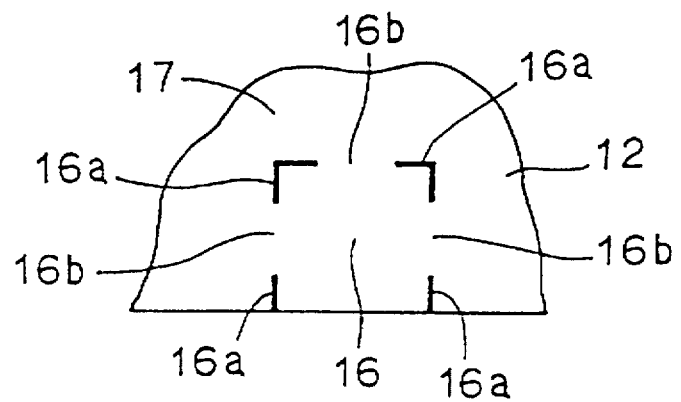
FIG. 5 is a plan view showing a press-fitted portion of a second metal plate.

FIG. 4 is a plan view showing the first and second metal plates 11 and 12 which are joined with each other, and FIGS. 6, 7, 8 and 9 are sectional views respectively taken along the lines VI—VI, VII—VII, VIII—VIII, and IX—IX in FIG. 4. FIG. 5 is an illustrative plan view showing each press-fitted portion 16 of the second metal plate 12.

Referring to FIGS. 4 and 5, parts of an end portion of the second metal plate 12 are press-molded with the lugs 14, to be press-fitted into the openings 15 in a state held between the openings 15 and the lugs 14 of the first metal plate 11. Each press-fitted portion 16 of the second metal plate 12 has cutoff or cut edge portions 16a which are cut off from the remaining portion 17, and connected edge portions or connecting webs 16b which are not cut off from but connected with the remaining portion 17. The cutoff portions 16a are formed by shearing of the second metal plate 12 during press molding thereof, since the clearances between the linear portions 14b and 15b of each lug 14 and each opening 15 of the first metal plate 11 are smaller than the thickness of the second metal plate 12. On the other hand, the second metal plate 12 is not sheared along in the parts or edge areas of its end portion 16 which are press-fitted through the lugs 14 but these parts remain as the connected portions 16b since the maximum clearances between the recesses 14a and 15a of each lug 14 and each opening 15 of the first metal plate 11 are larger than the thickness of the second metal plate 12.

Figure 6:
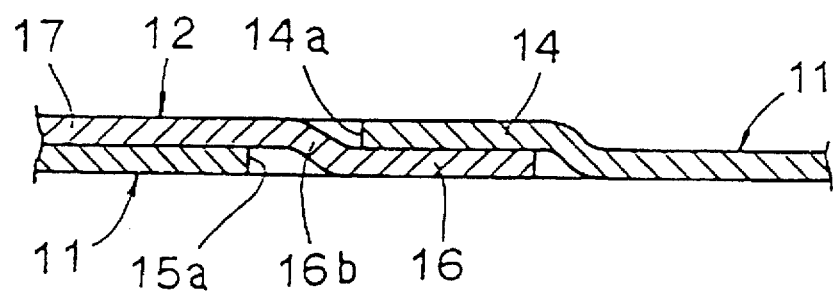
FIG. 6 is a sectional view taken along the line VI—VI in FIG. 4.

In the area along the section plane VI—VI shown in FIG. 6, the press-fitted portion 16 of the second metal plate 12 is connected to the remaining portion 17 through the connected portion 16b. The connected portion 16b, which extends obliquely with respect to the surface plane direction through the opening between the recesses 14a and 15a, has relatively weak contact force against the first metal plate 11.

Figure 7:
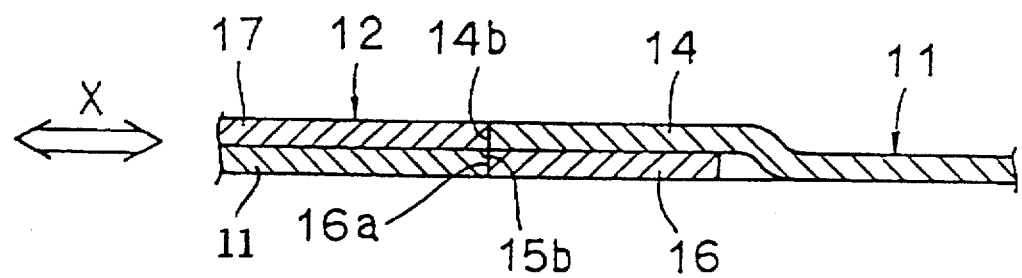
FIG. 7 is a sectional view taken along the line VII—VII in FIG. 4.

In the area along the sectional plane VII—VII shown in FIG. 7, the press-fitted portion 16 of the second metal plate 12 is cut off from the remaining portion 17 by shearing. Therefore, the cutoff edge portion 16a of the press-fitted portion 16 strikes and comes into contact with the linear edge portion 15b of the first metal plate 11. This contact force is so strong that no misregistration can occur in the directions of arrow X.

Figure 8:
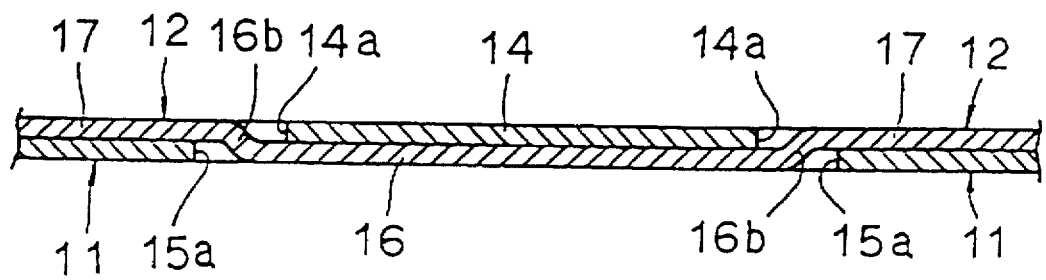
FIG. 8 is a sectional view taken along the line VIII—VIII in FIG. 4.

In the area along the section plane VIII—VIII shown in FIG. 8, the press-fitted portion 16 of the second metal plate 12 is connected with the remaining portion 17 through the connected portions 16b.

Figure 9:
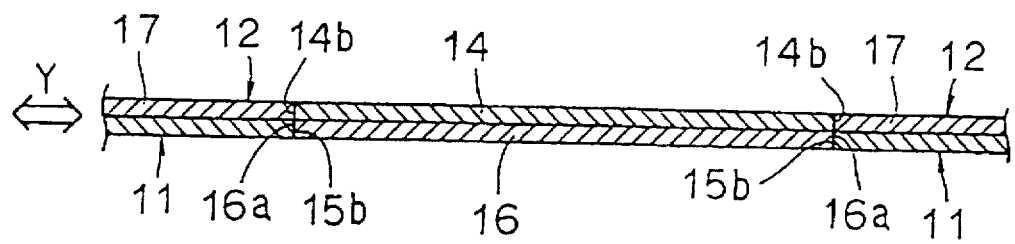
FIG. 9 is a sectional view taken along the line IX—IX in FIG. 4.

In the area along the section plane IX—IX shown in FIG. 9, the press-fitted portion 16 of the second metal plate 12 is cut off from the remaining portion 17 by shearing. Therefore, the cutoff edge portions 16a of the press-fitted portion 16 strike and come into contact with the linear edge portions 15b of the opening 15 of the first metal plate 11. This contact force is so strong that no misregistration can occur in the directions of arrow Y.

As clearly understood from the above description, the press-fitted portions 16 of the second metal plate 12 have the cutoff edge portions 16a which are cut off from the remaining portions 17 and the connected edge portions 16b which are not cut off from but connected with the remaining portions 17, whereby a strong joint structure is obtained with no misregistration.

Figure 10:
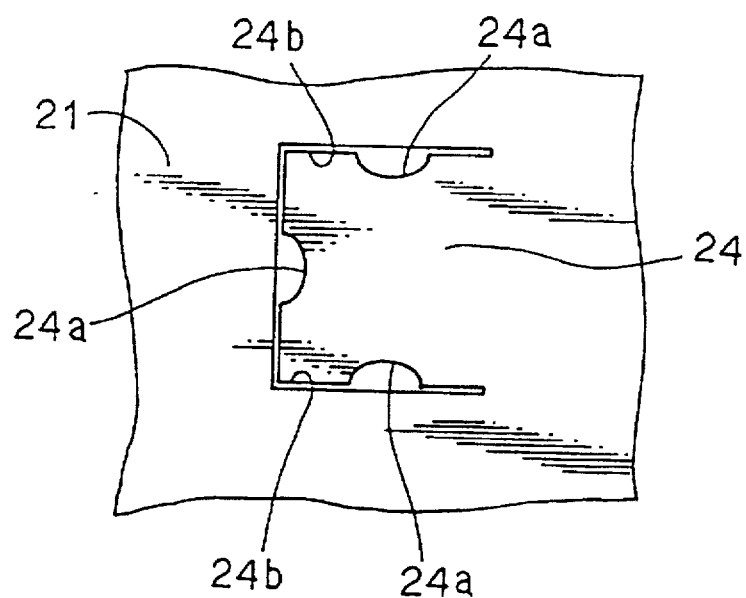
FIG. 10 is a plan view showing a lug of a first metal plate employed in another embodiment of the present invention.
Figure 11:
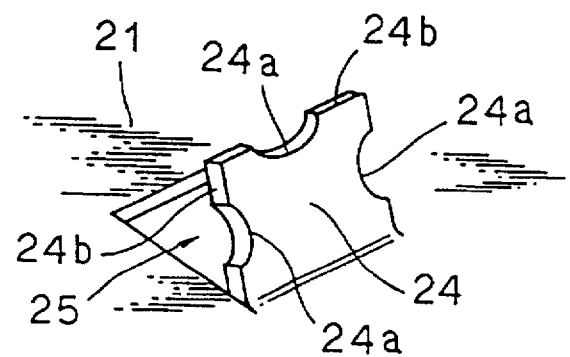
FIG. 11 is a perspective view showing the lug of FIG. 10 which is in a raised state.

FIGS. 10 and 11 illustrate another example of each lug 24 of a first metal plate 21. In the structure shown in these figures, the lug 24 of the first metal plate 21 includes recesses 24a and linear portions 24b. On the other hand, an opening 25 has only linear opening edges. Also in this embodiment, the maximum clearances between the recesses 24a of the lug 24 and the opening edges of the opening 25 are rendered larger than the thickness of a second metal plate to be joined with the first metal plate 21. On the other hand, the clearances between the linear portions 24b of the lug 24 and the opening edges of the opening 25 are rendered smaller than 30% of the thickness of the second metal plate. When press molding is carried out with such a lug 24, each press-fitted portion of the second metal plate is so formed to have cutoff portions and connected portions, similarly to the aforementioned embodiment.

Figure 12:
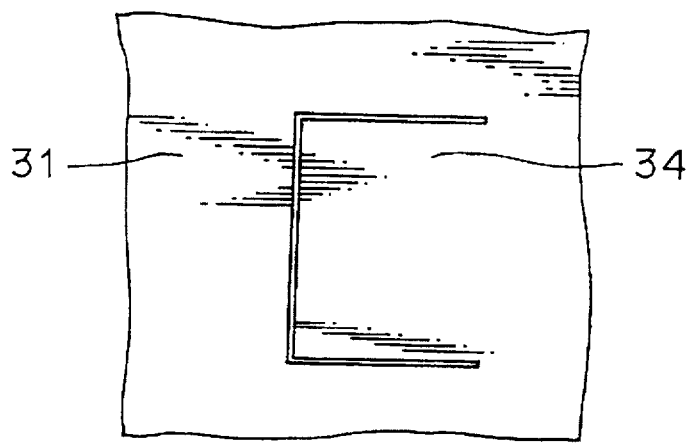
FIG. 12 is a plan view showing a lug of a first metal plate employed in still another embodiment of the present invention.
Figure 13:
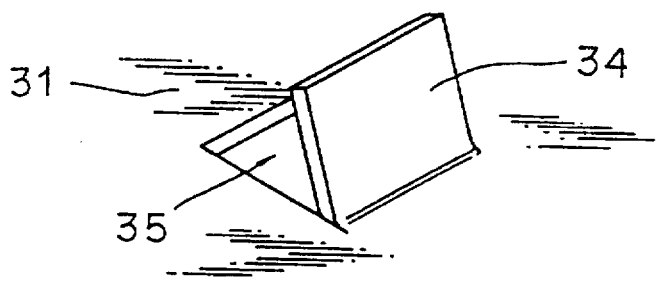
FIG. 13 is a perspective view showing the lug which is in a raised state.

FIGS. 12 to 16 illustrate still another embodiment of the joint structure according to the present invention. Referring to FIGS. 12 and 13, each lug 34 of a first metal plate 31 has no recesses, unlike to the aforementioned embodiments. Further, each opening 35 has no recesses either. A clearance between the lug 34 and the opening 35 is rendered smaller than 30% of the thickness of a second metal plate to be joined with the first metal plate 31. Thus, if a molding pressure would be uniformly applied to the overall region of each lug 34 to partially press-fit an end portion of the second metal plate, then the press-fitted portion of the second metal plate would be completely cut off and separated from the remaining portion and a proper joint would not be achieved.

Figure 14:
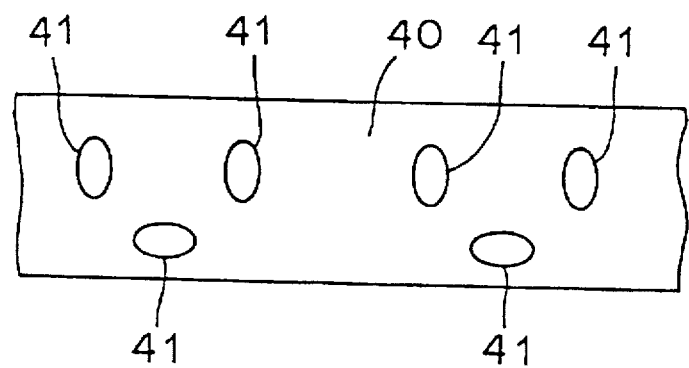
FIG. 14 illustrates the bottom surface of a punch.

In the embodiment shown in FIGS. 12 to 16, therefore, the shape of a punch 40 for pressing each lug 34 is improved so that it does not apply a uniform pressure as mentioned above. FIG. 14 illustrates the bottom surface of the punch 40. This punch 40 has a plurality of cavities 41 in portions or areas corresponding to outer edges of the lugs 34.

Figure 15:
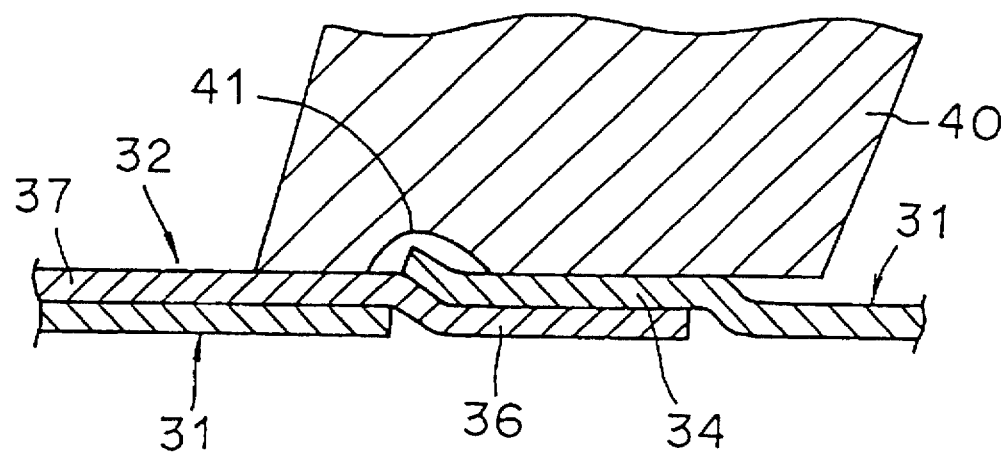
FIG. 15 is a sectional view showing a state of press molding with the punch of FIG. 14.
Figure 16:
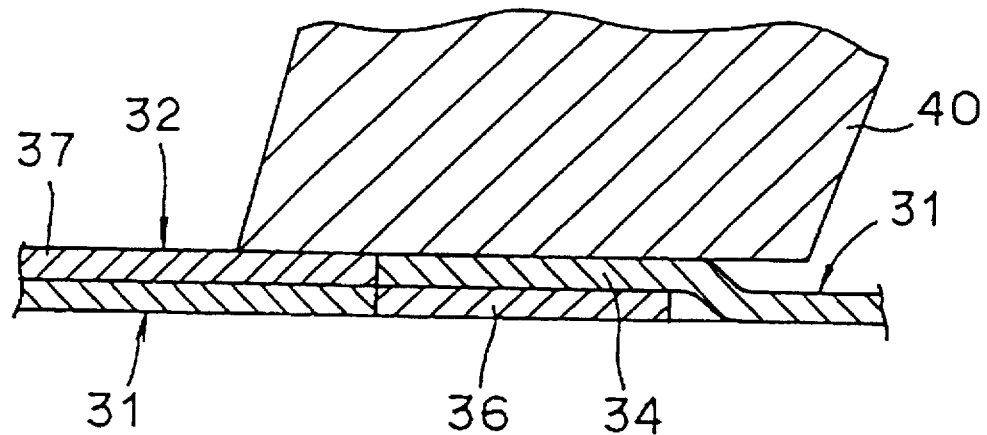
FIG. 16 is a sectional view showing a state of press molding with the punch of FIG. 14 in a position different from that shown in FIG. 15.
Figure 17:
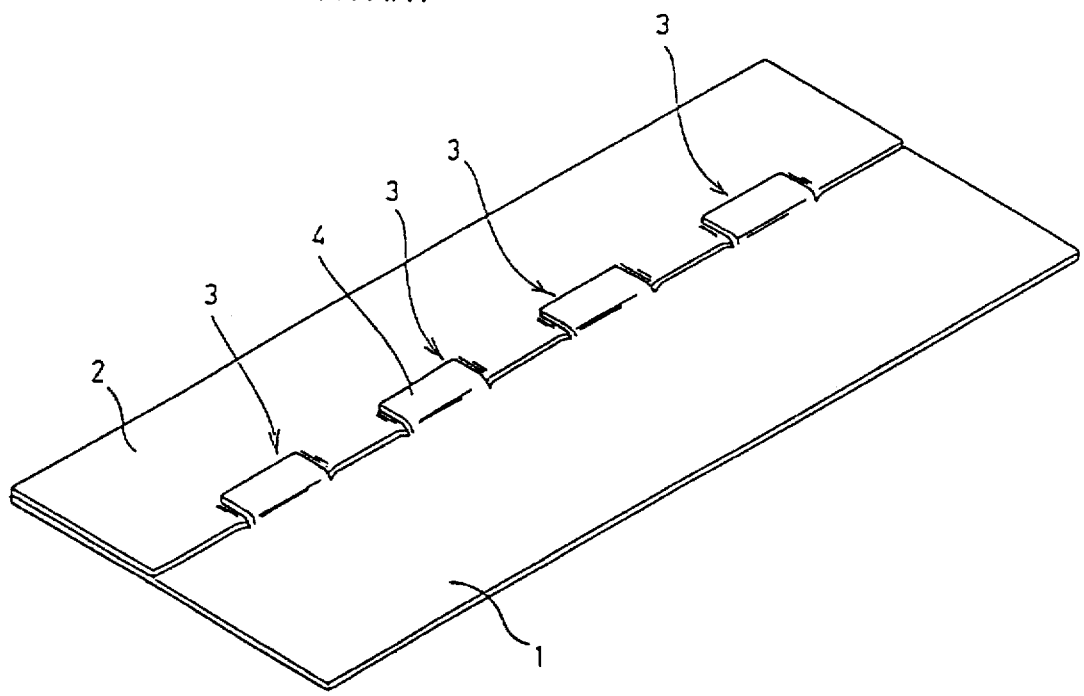
FIG. 17 is a perspective view showing a joint structure which is disclosed in Japanese Patent Publication No. 5-62241.
Figure 18:
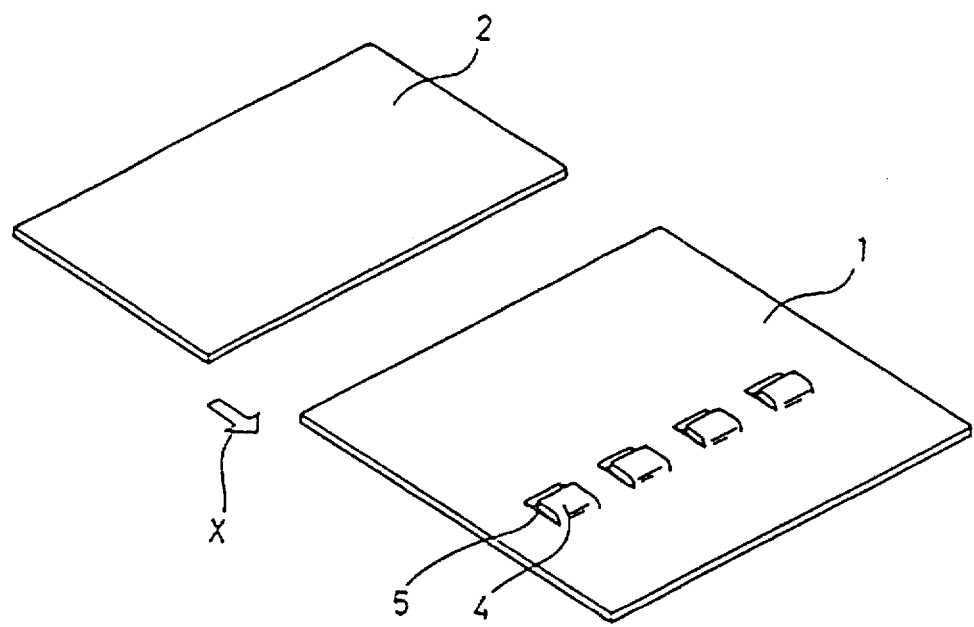
FIG. 18 is a perspective view showing first and second metal plates of the prior art joint structure.
Figure 19:
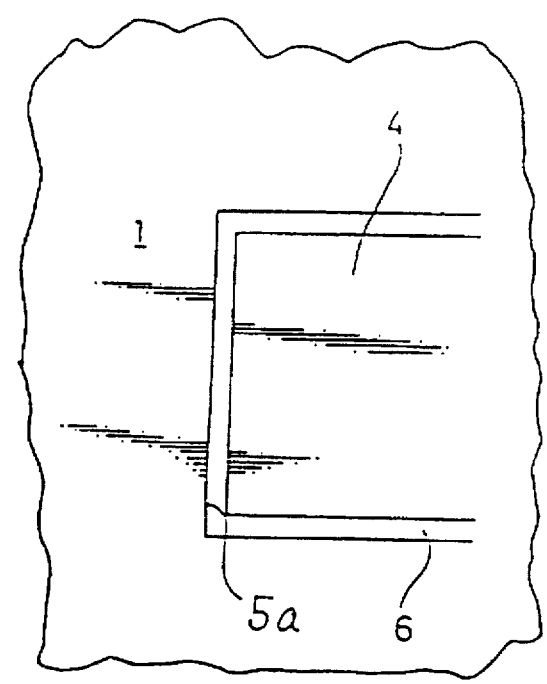
FIG. 19 is a plan view showing a lug which is still in an unraised state according to the prior art joint structure.
Figure 20:
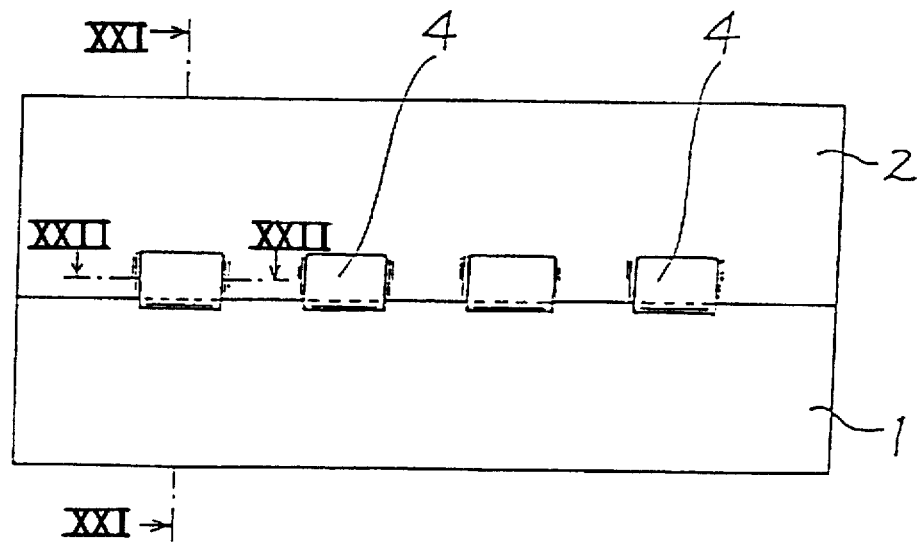
FIG. 20 is a plan view showing the joint structure which is disclosed in Japanese Patent Publication No. 5-62241.
Figure 21:
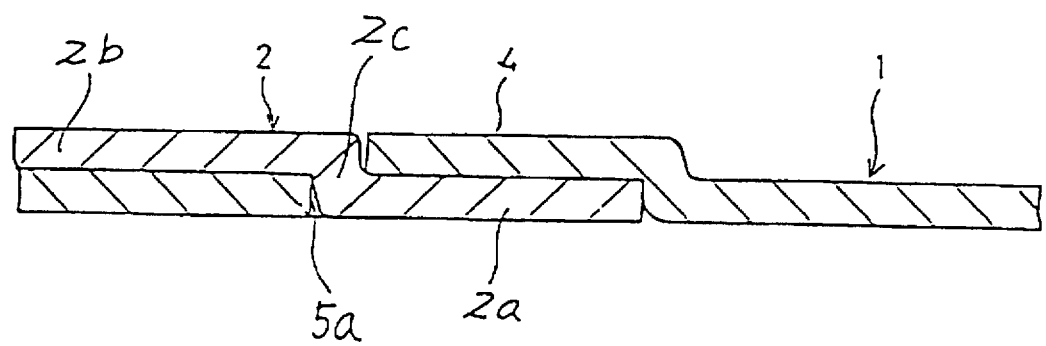
FIG. 21 is a sectional view taken along the line XXI—XXI in FIG. 20.
Figure 22:
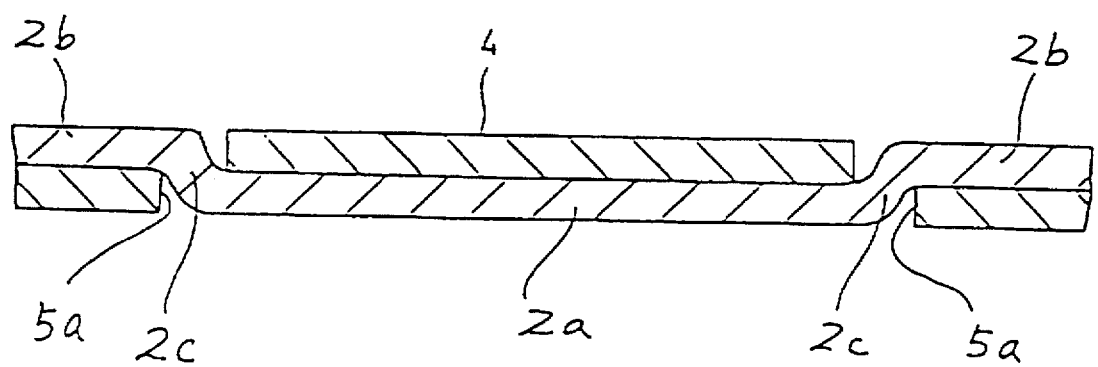
FIG. 22 is a sectional view taken along the line XXII—XXII in FIG. 20.

FIGS. 15 and 16 show the punch 40 pressing each lug 34. As shown in FIG. 15, each press-fitted portion 36 of a second metal plate 32 is not cut off and separated from the remaining portion 37 but instead remains connected with the same in an area of the cavities 41 of the punch 40. In the position shown in FIG. 15, each lug 34 of the first metal plate 31 is provided along its outer edges with a mount portion or protruding lip portion that mounts onto the remaining portion 37 of the second metal plate 32.

In the are shown in FIG. 16, i.e. an area where the punch 40 is not provided with a cavity 41, each press-fitted portion 36 of the second metal plate 32 is pressed by the lug 34 of the first metal plate 31 and is sheared of cut off and separated from the remaining portion 37. In this state, the press-fitted portion 36 is strongly in contact with opening edges of each opening 35 of the first metal plate 31, whereby no misregistration is caused between the first and second metal plates 31 and 32. In the area shown in FIG. 16, the lug 34 of the first metal plate 31 is provided along its outer edges with an embedded portion or flush portion which is flush with the remaining portion 37 of the second metal plate 32.

As clearly understood from FIGS. 15 and 16, the lug 34 of the first metal plate 31 is provided along its outer edges with the embedded portion which is flush with the remaining portion 37 of the second metal plate 32 and the mount portion which mounts this remaining portion 37. A cutoff portion and a connected portion of the press-fitted portion are positioned under the embedded portion and the mount portion respectively.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A joint arrangement of metal plates joined to each other, comprising
    a first metal plate having a lug thereon and an opening, and
    a second metal plate having an end portion that is at least partially superposed with said first metal plate such that a press-fitted portion of said end portion is press-molded with said lug, to be press-fitted into said opening in a state held between said opening and said lug,
    wherein said press-fitted portion of said end portion of said second metal plate has a cutoff portion that is cut off from a remaining portion of said second metal plate and a connected portion that is not cut off from and is connected with said remaining portion, and
    wherein said opening is defined and bounded by opening edges, wherein a clearance between said opening edges of said opening and said lug is smaller in a portion corresponding to said cutoff portion of said press-fitted portion and larger in a portion corresponding to said connected portion of said press-fitted portion.

2. The joint arrangement in accordance with claim 1, wherein said clearance is smaller than 30% of a thickness of said second metal plate in said portion corresponding to said cutoff portion of said press-fitted portion, and larger than said thickness of said second metal plate in said portion corresponding to said connected portion of said press-fitted portion.

3. The joint arrangement in accordance with claim 1, wherein said lug has outer edges including an embedded portion that is flush with said remaining portion of said second metal plate and a mount portion that is mounted onto said remaining portion of said second metal plate,
    and wherein said cutoff portion and said connected portion are positioned under said embedded portion and said mount portion respectively.

4. A combination of joined metal plates comprising a first metal plate having an opening therein bounded by at least one opening cut edge and an opening lug root edge, and having a lug that extends above a major plane of said first metal plate over said opening, and that has at least one free edge and a root that is connected to said lug root edge, a second metal plate that is at least partially overlapped onto said first metal plate, and that has a plate edge and a joint engaging portion provided at said plate edge, wherein said engaging portion of said second metal plate is engagedly received in said opening and held under said lug of said first metal plate, wherein said engaging portion has at least two cut-off edges at which said engaging portion is separated from a remainder of said second metal plate, and at least one connecting web between said cut-off edges at which said engaging portion is connected with said remainder of said second metal plate, wherein said at least two cut-off edges of said engaging portion abut against said at least one opening cut edge, and wherein said lug and said opening are dimensioned such that a clearance distance between said at least one free edge of said lug and said at least one opening cut edge of said opening is smaller than a thickness of said second metal plate.

5. The combination of joined metal plates in accordance with claim 4, wherein said clearance distance is located at a first area in registration with said cut-off edges of said engaging portion end is smaller than 30% of said thickness of said second metal plate.

6. The combination of joined metal plates in accordance with claim 4, wherein said clearance distance is relatively smaller at a first area in registration with said cut-off edges of said engaging portion and relatively larger at a second area in registration with said connecting web of said engaging portion.

7. The combination of joined metal plates in accordance with claim 6, wherein said clearance distance is located at said second area in registration with said connecting web of said engaging portion is larger than said thickness of said second metal plate.

8. The combination of joined metal plates in accordance with claim 7, wherein said clearance distance is located at said first area in registration with said cut-off edges of said engaging portion is smaller than 30% of said thickness of said second metal plate.

9. The combination of joined metal plates in accordance with claim 6, wherein said at least one opening cut edge of said opening and said at least one free edge of said lug include straight cut edge portions that form said smaller clearance distance therebetween at said first area, and at least one of said opening cut edge of said opening and said free edge of said lug includes a recessed edge portion that is recessed relative to said straight cut edge portions and that forms said larger clearance distance at said second area.

10. The combination of joined metal plates in accordance with claim 9, wherein both said opening cut edge of said opening and said free edge of said lug include respective ones of said recessed edge portion arranged opposite and facing one another with said larger clearance distance therebetween.

11. The combination of joined metal plates in accordance with claim 9, wherein said straight cut edge portions are in registration with said cut-off edges of said engaging portion, and said recessed edge portion is in registration with said connecting web of said engaging portion.

12. The combination of joined metal plates in accordance with claim 4, wherein said engaging portion has a plurality of said connecting webs arranged in alternation with said cut-off edges.

13. The combination of joined metal plates in accordance with claim 4, wherein said engaging portion of said second metal plate is received in said opening so as to lie in said major plane of said first metal plate, and said lug lies in a major plane of said second metal plate.

14. The combination of joined metal plates in accordance with claim 4, wherein said at least one free edge of said lug includes a flush portion that lies flush with said second metal plate in a major plane of said second metal plate and in registration over said cut-off edges of said engaging portion, and a protruding lip portion that extends over said connecting web of said engaging portion and protrudes above an upper surface of said second metal plate.

15. The combination of joined metal plates in accordance with claim 14, wherein said clearance distance is smaller than said thickness of said second metal plate at all areas along said at least one free edge of said lug.

16. The combination of joined metal plates in accordance with claim 15, wherein said clearance distance is smaller than 30% of said thickness of said second metal plate at all areas along said at least one free edge of said lug.

17. The combination of joined metal plates in accordance with claim 4, wherein said clearance distance is smaller than said thickness of said second metal plate at all areas along said at least one free edge of said lug.

18. The combination of joined metal plates in accordance with claim 17, wherein said clearance distance is smaller than 30% of said thickness of said second metal plate at all areas along said at least one free edge of said lug.

* * * * *

UNITED STATES PATENT AND TRADEMARK OFFICE
CERTIFICATE OF CORRECTION

PATENT NO. : 5,678,946
DATED : Oct. 21, 1997
INVENTOR(S) : Enami

It is certified that error appears in the above-identified patent and that said Letters Patent is hereby corrected as shown below:

On the title page item [56], Other Publications, line 8, replace "3176" by --317--;

| | | |
|---|---|---|
| Col. 2, | line 30, | replace "Joint" by --joint--; |
| Col. 4, | line 15, | after "its" insert --outer--; |
| Col. 5, | line 45, | delete "to"; |
| | line 67, | replace "position" by --area--; |
| Col. 6, | line 4, | replace "are" by --area--; |
| | line 7, | replace "of" by --or--; |
| Col. 7, | line 32, | replace "end" by --and--; |
| | line 41, | delete "is located"; |
| | line 46, | delete "is located". |

Signed and Sealed this

Twenty-eighth Day of April, 1998

Attest:

BRUCE LEHMAN

*Attesting Officer*         *Commissioner of Patents and Trademarks*